United States Patent
Fruehan et al.

(10) Patent No.: US 6,849,101 B1
(45) Date of Patent: Feb. 1, 2005

(54) METHOD USING SELECTED CARBONS TO REACT WITH $AL_2O$ AND AL VAPORS IN THE CARBOTHERMIC PRODUCTION OF ALUMINUM

(75) Inventors: Richard J. Fruehan, Murrysville, PA (US); Yun Li, Murrysville, PA (US); Gerald Carkin, Tarentum, PA (US)

(73) Assignees: Alcoa Inc., Pittsburgh, PA (US); Elkem ASA, Oslo (NO); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/728,512

(22) Filed: Dec. 4, 2003

(51) Int. Cl.[7] ............... C22B 21/02; C01B 31/30
(52) U.S. Cl. ............ 75/10.27; 75/10.36; 75/674; 423/247; 423/439
(58) Field of Search .............. 75/10.27, 10.36, 75/674; 423/247, 439

(56) References Cited

U.S. PATENT DOCUMENTS

| 2,974,032 A | 3/1961 | Grunert et al. |
|---|---|---|
| 4,099,959 A | 7/1978 | Dewing et al. |
| 4,261,736 A | 4/1981 | Dewing et al. |
| 4,486,229 A | 12/1984 | Troup et al. |
| 4,491,472 A | 1/1985 | Stevenson et al. |
| 6,124,028 A | 9/2000 | Nagle et al. |
| 6,440,193 B1 | 8/2002 | Johansen et al. |
| 6,530,970 B2 * | 3/2003 | Lindstad .......... 75/10.27 |

FOREIGN PATENT DOCUMENTS

CA          1185435          4/1985

OTHER PUBLICATIONS

FAO Forestry Department, Simple Technologies for Charcoal Making, FAO Forestry Paper 41, 1987, 7 pages, Rome, Italy.

* cited by examiner

*Primary Examiner*—Melvyn Andrews
(74) *Attorney, Agent, or Firm*—Tracey D. Beiriger

(57) ABSTRACT

In a method for recovering Al from an off-gas (3,4) produced during carbothermic reduction of aluminum utilizing at least one smelter (1,2), the off-gas (3,4) is directed to an enclosed reactor (5) which is fed a supply of wood charcoal (7) having a porosity of from about 50 vol. % to 85 vol. % and an average pore diameter of from about 0.05 μm to about 2.00 μm, where the wood charcoal (7) contacts the off-gas (3,4) to produce at least $Al_4C_3$ (6), which is passed back to the smelter (1,2).

12 Claims, 3 Drawing Sheets

METHOD USING SELECTED CARBONS TO REACT WITH AL₂O AND AL VAPORS IN THE CARBOTHERMIC PRODUCTION OF ALUMINUM

GOVERNMENT CONTRACT

The Government of the United States of America has rights in this invention, pursuant to Contract No. DE-FC07-00ID-13900 with the United States Department of Energy.

FIELD OF THE INVENTION

The present invention relates to a method of producing additional $Al_4C_3$ that is required to satisfy the reactions involved in the carbothermic production of aluminum by reacting $Al_2O$ and Al off-gas vapors with selected carbons to form $Al_4C_3$, which is recycled into a smelter where it reacts to form aluminum.

BACKGROUND OF THE INVENTION

The direct carbothermic reduction of alumina has been described in U.S. Pat. Nos. 2,974,032 (Grunert et al.) and 6,440,193 B1 (Johansen et al.). It has long been recognized that the overall reaction.

$$Al_2O_3 + 3C = 2Al + 3CO \qquad (1)$$

takes place, or can be made to take place, generally in steps such as:

$$2Al_2O_3 + 9C = Al_4C_3 + 6CO \text{ (vapor)} \qquad (2)$$

$$Al_4C_3 + Al_2O_3 = 6Al + 3CO \text{ (vapor)} \qquad (3)$$

$$Al_2O_3 + 2C = Al_2O + 2CO \text{ (vapor)} \qquad (4)$$

$$Al_2O_3 + 4Al = 3Al_2O \text{ (vapor)} \qquad (5), \text{ and}$$

$$Al = Al \text{ (vapor)} \qquad (6).$$

Reaction (2) takes place at temperatures below 2000° C. and generally between 1900° C. and 2000° C. Reaction (3), which is the aluminum producing reaction, takes place at higher temperatures of about 2050° C. Very importantly, in addition to the species stated in reactions (2) and (3), volatile species including gaseous Al, reaction (6), and gaseous aluminum suboxide that is $Al_2O$, are formed in reaction (4) or (5) and are carried away with the off gas. Unless recovered, these volatile species will represent a loss in the yield of aluminum and the large amount of energy associated with the reduction and vaporization steps.

In the overall carbothermic reduction process, the $Al_2O$ and Al gases are recovered by reacting them with carbon in a separate reactor usually called the vapor recovery unit or vapor recovery reactor, as taught, for example, in U.S. Pat. No. 6,530,970 B2 (Lindstad). There, a carbon-hydrogen gas, such as methane, butane, acetylene or the like was cracked to provide a finely dispersed carbon which could be deposited on carbon seed particles. This required an extra cracking step. Depending on the gas composition and reaction temperature, the reaction product with carbon may be $Al_4C_3$, an ($Al_4C_3$—$Al_2O_3$) liquid slag or the gases may simply condense as $Al_2O_3$. It is desirable to form $Al_4C_3$ because it is required in the smelting furnace and the energy associated with the Al and $Al_2O$ is recovered as valuable chemical energy and can be returned to the smelter. If the $Al_2O_3$ and carbon form by condensation the energy is released as heat in the vapor recovery reactor and very little is returned to the process. If an $Al_4C_3$—$Al_2O_3$ slag forms, all of the Al and some of the energy are recovered. However, the liquid product may cause bridging of the particles in the reactor making it difficult to operate the vapor recovery reactor.

Other patents relating to carbothermic reduction to produce aluminum include U.S. Pat. Nos. 4,486,229 and 4,491,472 (Troup et al. and Stevenson et al.) Dual reaction zones are described in U.S. Pat. No. 4,099,959 (Dewing et al.), where off gases are passed through granular carbon material and countercurrent to fresh coal or "green" coke in a gas scrubber. In Dewing et al., U.S. Pat. No. 4,261,736, the off-gas, containing Al vapor and $Al_2O$ is contacted with particulate carbon in a fluidized bed maintained at a temperature above the temperature at which sticky aluminum oxycarbide forms and where heated carbon enriched with $Al_4C_3$ is removed from the fluidized bed. When using carbon particles as taught in this patent the surface area of each carbon particle may eventually become covered by reaction products and the reaction rate will thus be reduced as the gas must penetrate the reaction product layer on each carbon particle in order to continue the reaction. Only a part of the carbon in the carbon particles will thus be reacted to $Al_4C_3$. Consequently, the efficiency of the reaction is low. Also Al and $Al_2O$ vapors flow higher up the reactor forming slag or condensing, and unreacted carbon enters the main smelter, which is undesirable.

In Canadian Patent No. 1,15,435 (Sood et al.) a packed carbon bed consisting of "active" carbon in whole or in part converts Al and $Al_2O$ fume gas directly into $Al_4C_3$. There "active" carbon is considered to be any form of carbon possessing a large specific surface area and consequently a relatively low strength, so that the resulting $Al_4C_3$ reaction product does not adhere strongly to the carbon particles and/or is very porous and open, so that the deposition of the reaction product does not result in cementing of the carbon particles to one another.

The variety of wood species that can be used to make charcoal is widely varied, as described in FAO FORESTRY PAPER 41 (1987) "Simple Technologies for Charcoal Making" http://www.fao.org/docre/x5328e/x5328e00.htm, Aug. 19, 2002, and includes: Dakama, Wallaba, Kautaballi, Tropical hardwood, Oak, Coconut, and Eucalyptus Saligna. U.S. Pat. No. 6,124,028 (Nagle) also discuss activated carbons and charcoal and carbonized/carbon-polymer wood products, mentioning use of Lignum, Maple, Oak, Basswood, Pine, Redwood, Balsa, and Poplar. The wood products are described as useful for furniture, brake shoes, sports equipment, tubing, brake rotors and the like.

In the carbothermic process, the type carbon used will be important to improve $Al_4C_3$ formation and decrease $Al_2O_3$ formation in the vapor recovery reactor. Reaction rates and thermodynamic considerations are important. What is needed is an efficient method for recovering the volatile Al species, and to reduce the 25% energy loss and the 25% aluminum lost leaving as a gas. Therefore, it is one of the main objects of this invention to provide a more cost and energy effective improved aluminum production process by use of new or vastly improved material in the off-gas reactor.

SUMMARY OF THE INVENTION

The above needs are met and the above problems solved by providing a method for recovering Al containing vapor species (Al and $Al_2O$) from an off-gas produced in at least one smelter during carbothermic reduction of alumina to form aluminum, where the off-gas comprises CO, Al (vapor) and $Al_2O$ (vapor) that is aluminum suboxide, comprising: (a) directing the said off-gas to an enclosed reactor at an elevated temperature; (b) supplying-wood charcoal having a porosity of from about 50 vol. % to 85 vol. %, and a bulk density of from about 0.4 g/cm³ to 0.7 g/cm³, to the enclosed reactor; and (c) contacting the wood charcoal with the off-gas to produce a product comprising $Al_4C_3$. Preferably, the wood charcoal has an average pore diameter of from about 0.05 μm to about 2.00 μm. The term "aluminum suboxide" as used herein is intended to encompass $Al_2O$ and compounds having aluminum to oxygen ratios other than 2:1. One wood charcoal that is particularly useful as the catalyst bed in the reactor is an eucalyptus wood charcoal. The term "elevated temperature" means from about 1550° C. to about 2050° C.

The porosity should be at least about 50 vol. % to accommodate the volume change when carbon is converted to $Al_4C_3$. If the porosity is too low the $Al_4C_3$ crystals will fill or block the pores inhibiting the reacting gas from contacting the unreacted carbon. For example, when a low porosity carbon is used $Al_4C_3$ forms on the outer surface of the carbon but not in the interior. The porosity should be relatively uniform with most of the average pore diameter between about 0.05 μm and about 2.00 μm. For example, metallurgical coke has a relatively high porosity, greater than 50 vol. %, but the pores can be as large as 200 μm or larger and others less than 0.1 μm. Therefore the porosity is primarily associated with a relatively small number of large pores. In this case the surfaces of these large pores react but the majority of the carbon does not react because the pores become blocked. On the other hand if the porosity is greater than about 85 vol. % the catalyst bed will lack sufficient strength to be used in a counter current reactor.

One type of wood charcoal stands above the variety of carbon products used in metallurgical processes including carbothermic vapor recovery in carbothermic reduction of alumina in terms of the porosity and uniform pore diameter to allow the $Al_4C_3$ to form deep into the carbon particle rather than clogging the pores. In this form of carbon wood charcoal, the reactions continue because the Al containing vapors (Al and $Al_2O$) can diffuse through the pores and react to form aluminum carbide rather than forming a material which fills the pores causing the reaction to stop. The charcoal is preferably made from Eucalyptus wood, most preferably from the variety Brazilian Eucalyptus Camaldulensis. This material has a uniform pore size as seen in FIG. 4. This material has a porosity of between about 55% and 65% and has relatively uniform pore distribution/diameter as indicated in area A of FIG. 4. It also has a low ash content of from about 2% to 4%.

The use of eucalyptus as described above increases the rate of $Al_4C_3$ formation by over 100% as compared to other forms of carbon. It allows for the possible complete or near complete (at least 85%) conversion of carbon to carbide as compared to less than 30% for other forms of carbon. Furthermore if the Al and $Al_2O$ vapors do not form carbide they will simply condense so that much of the energy is lost, or form a slag which will hinder the gas flow through the counter-current reactor, thereby impairing its performance.

BRIEF DESCRIPTION OF THE DRAWINGS

The invention is further described with reference to the accompanying non-limiting drawings in which.

DETAILED DESCRIPTION OF PREFERRED EMBODIMENTS

Figure 1:
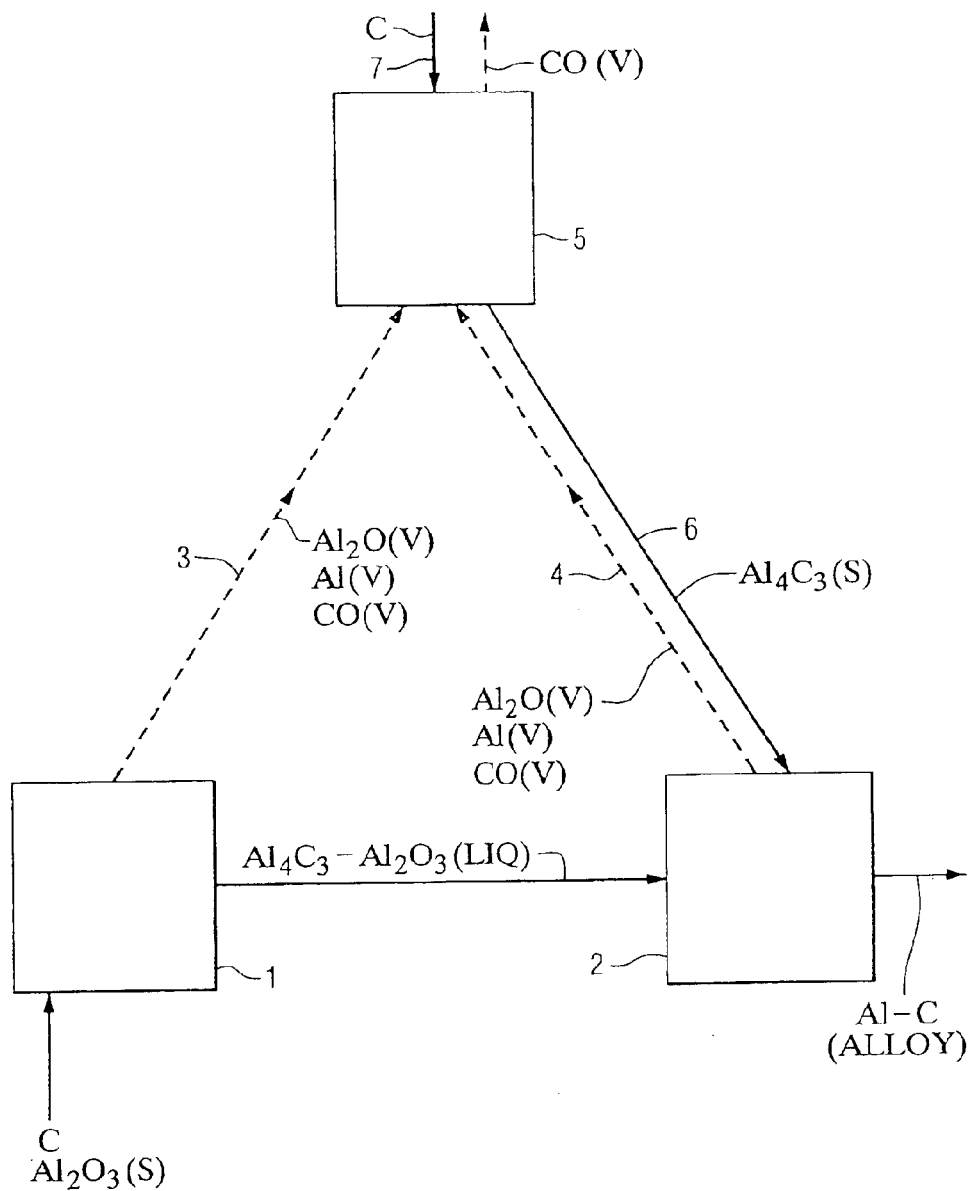
FIG. 1 is a flow sheet showing one example of a complete system a carbothermic reduction process for the production of aluminum.

FIG. 1 illustrates one embodiment of a carbothermic reaction process to provide metals such as aluminum, recover Al and $Al_2O$ in the off-gases as $Al_4C_3$, and pass the $Al_4C_3$ to the smelting furnace. In FIG. 1, gas flows are shown as dashed lines and flows of solids and molten substances are shown as solid lines.

In FIG. 1, the off-gas from a carbothermic smelting furnace comprising a first stage 1 and possibly a second stage 2 is forwarded via conduits 3 and 4 to an enclosed off-gas reactor 5 operating at a temperature of about 2000° C. This reactor 5 can be a counter-current moving bed reactor, which would operate at a top temperature of from about 1600° C. to about 1800° C. There could be more than one such reactor, for example, one for stage one smelter 1 and one for stage two smelter 2. The reactor 5, could also be a fluid bed or a series of fluid beds. The Al-components of the off-gas entering the reactor 5 react with the carbon 7 to form $Al_4C_3$. The $Al_4C_3$ is removed from the reactor and forwarded to stage 2 of the carbothermic furnace through a conduit 6.

The gas from reactor 5 contains primarily CO, possibly some $H_2$ from the volatile part of the charcoal and little or no Al or $Al_2O$. The off gas from reactor 5 has a high energy value as hot CO and could be used to produce electrical energy in a gas turbine or conventional boiler. The aluminum vapor species will have reacted to carbide or condensed to $Al_2O_3$ and C. The $Al_4C_3$ and unreacted carbon is fed into the second stage of the carbothermic smelter via conduit 6. An Al—C liquid alloy exits smelter stage 2 as shown in FIG. 1, where (s) means solid, (v) means vapor and (liq) means liquid.

In any carbothermic reduction process for aluminum extremely high temperatures (>2000° C.) are required. At these temperatures a large quantity of Al and $Al_2O$ gases species are associated with the CO off gas. Depending on the temperature and melt ($Al_2O_3$—$Al_4C_3$) composition, the pressures of $Al_2O$—Al can be 0.2 atm or higher. This could represent over 25% of the aluminum metal produced leaving the furnace as a gas. In order for the process to be economical the aluminum in the gas and the energy consumed in producing the Al vapor species must be captured in the process. The potential mass loss of Al is obvious, but equally important is that a large portion of the energy supplied to the process is consumed producing these vapor species. Depending on the operating conditions, the energy lost could be 25% or higher.

In order to investigate the rate of reaction of $Al_2O$ and Al vapors with carbon it is necessary to produce these species and have knowledge of their pressures. One way to achieve this is to react $Al_2O_3$ with carbon to form aluminum carbide as is done in the actual carbothermic reduction process. As the $Al_2O_3$ slag melt is heated in the presence of carbon the first step, or stage, the $Al_2O_3$ is reduced to form $Al_4C_3$ at about 2000° C.

$$Al_2O_3 + 6C = Al_4C_3 + 3CO$$

During this process Al and $Al_2O$ vapors are formed. If equilibrium is assumed the vapor pressure can be calculated from any relevant reaction. For example for $Al_2O$:

$$Al_2O_3 + 2C = Al_2O\ (g) + 2CO$$

As the temperature is increased above about 2050° C. to 2080° C., Al metal is produced containing carbon in solution by the following reaction:

$$Al_4C_3 + Al_2O_3 = 6Al + 3CO$$

and Al and $Al_2O$ gases are produced at higher partial pressures. The Al and $Al_2O$ vapors then react with carbon in the vapor recovery unit forming $Al_4C_3$, a $Al_4C_3$—$Al_2O_3$ slag, or condense as C and $Al_2O_3$. Calculating the vapor pressures of $Al_2O$ and Al produced as well as their subsequent reaction product with carbon requires knowledge of the free (D energies of formation and the activities of the relevant species. The Al and $Al_2O$ react with carbon in the vapor recovery reactor by the following reactions:

$$2Al_2O + 5C = Al_4C_3 + 2CO$$

$$4Al + 3C = Al_4C_3$$

Various forms of carbon, however, have very different properties which were found to help or hinder the formation of $Al_4C_3$. It was found that, with carbon such as graphite, low porosity metallurgical coke, petroleum coke and high overall but not uniform porosity metallurgical coke, the $Al_4C_3$ does not form to any great extent. Once the carbide begins to form it fills the pores on the surface, hindering further reaction if the porosity is less than about 50 vol. %. High porosity metallurgical coke, about 51 vol. % porous can consist of a very few very large pores and numerous smaller pores. Again, the reaction stops once these small pores are filled. So, in addition to high porosity, the pores must be uniform in size.

Very importantly, it was found that certain types of wood charcoal with over about 50 vol. % porosity reacted extensively forming $Al_4C_3$ when exposed to CO—Al—$Al_2O$ gas generated from reduction of $Al_2O_3$ by carbon. The high porosity is essential since the rate of reaction is controlled by the diffusion of the reaction gas through the pores of the product layer $Al_4C_3$. If the pores are filled or nearly filled the reaction stops. There is a significant volume change going from carbon to the carbide pores existing in the original carbon as the pores become filled with carbide crystals, as confirmed by SEM analysis. To accommodate this increase in volume and maintain reasonable porosity in the carbide layer the porosity of the original carbon must be very high. In addition, the porosity must be uniform. One of the metallurgical cokes tested had a high porosity but did not react extensively. The coke had a few large pores but the majority of the coke was not very porous. The area associated with the large pores was small as compared to the wood charcoal.

It is also very important to note that another major requirement for the carbon used in carbothermic reduction is the amount of ash. The ash normally consists of $SiO_2$, iron oxides, other oxides and iron sulfide. These oxides and sulfides will be reduced in the process, and the silicon, iron, etc. will be in the final aluminum and will be difficult to remove. Again, selected wood charcoal best fulfills this requirement; it contains the lowest amount of ash of any of the carbons tested except graphite which does not react and is not a practical carbon source.

Figure 2:
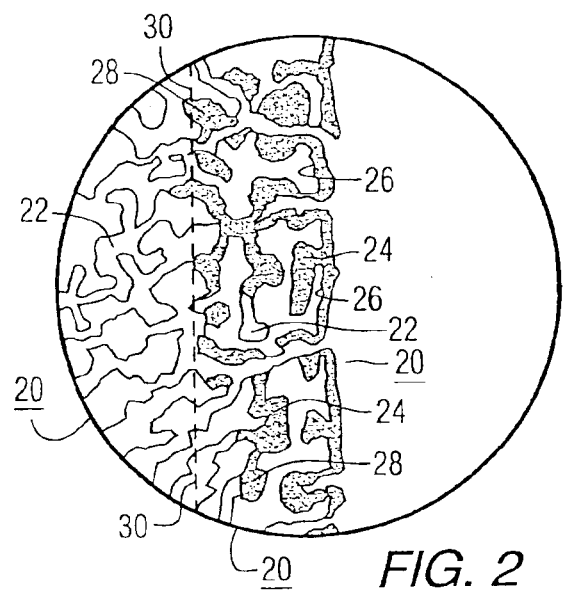
FIG. 2 is an enlarged idealized cross-section of $Al_4C_3$ permeation into the pores of the eucalyptus charcoal carbon particles used in the off-gas reactor, showing that the pores at least remain partly open allowing continuing reaction to form $Al_4C_3$ by the reaction of gaseous $Al_2O$ and the carbon.

As shown in FIG. 2 selected, low ash, high porosity wood charcoal, preferably eucalyptus wood charcoal 20, shown in magnified idealized form, having a porous matrix with a large number of interconnected, relatively uniform pores 22, allows the off-gases to collect and form $Al_4C_3$ crystals 24, not only at the surface 26 of the wood charcoal particle but deep within the interior pore structure, as shown at points 28, up to an interface zone 30 shown by the dotted line.

It has been found that Eucalyptus wood charcoal, preferably Brazilian Eucalyptus Camaldulensis charcoal has the right properties for use in the off-gas reactor. Table 1 shows the properties of such Brazilian Eucalyptus charcoal.

TABLE 1

| Determinations - Moist Basis (as received) | | | |
|---|---|---|---|
| % Moisture: | 10.5 | % Fix. Carbon: | 71.3 |
| Determinations - Dry Basis: | | | |
| | % in ash | | |
| % Ash: | 2.7 | % $SiO_2$: | 37.3 |
| % Volatile: | 17.6 | % $Fe_2O_3$: | 4.9 |
| % Fixed Carbon: | 79.7 | % $Al_2O_3$: | 2.9 |
| Weight (g/l): | 0 | % $TiO_2$: | 0.2 |
| % P: | 0.000 | % CaO: | 27.8 |
| % S: | 0.000 | % MgO: | 6.1 |

Figure 4:
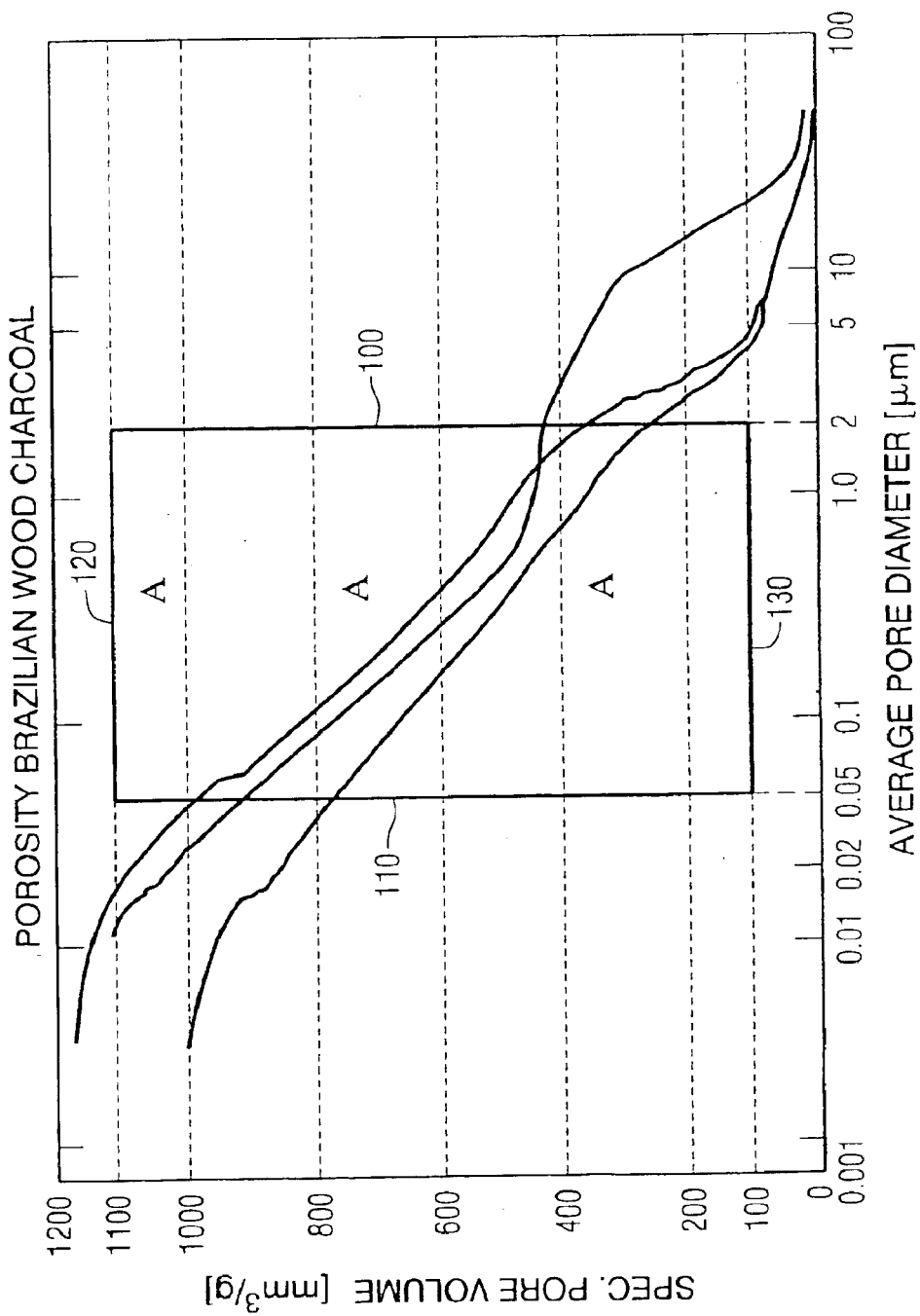
FIG. 4 is a graph of eucalyptus wood charcoal in terms of specific pore volume vs. average pore diameter with a useful range shown as area A, within lines 100, 110, 120 and 130, wherein 80% of the pore volume has diameters in the range of 0.05 to 2.0 micrometers (μm), between lines 100 and 110.

FIG. 4, area A between lines 100 and 110 also provides the useful range of porosity for this wood charcoal, where at least 80% of the pores have an average diameter in the range of from about 0.05 micrometers to about 2.0 micrometers.

EXAMPLES

Figure 3:
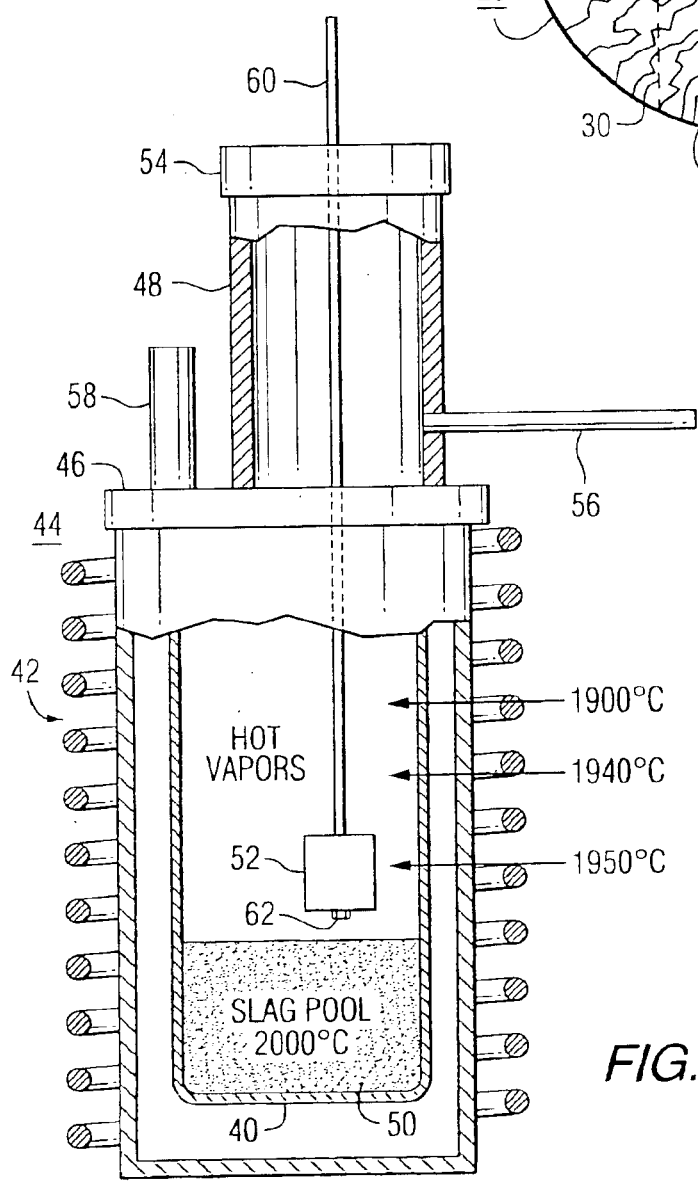
FIG. 3 is a schematic diagram of the experimental equipment used for reacting the carbon samples.

One of the major obstacles in studying the reaction of Al and $Al_2O$ gaseous species with carbons is generating these gases in sufficient quantities. To do so, temperatures in excess of 2000° C. are required. A schematic diagram of the specially designed experimental equipment is shown in FIG. 3. The melts used to generate the vapors were heated in a graphite crucible 40 (17.5 cm ID) in a 65 kw induction furnace 42. The reactor 44, having an optical sight tube 58, was fitted with a tight lid 46 and a chimney 48 also with cap 54. About 5 kg to 7 kg of a ($Al_2O_3$–$Al_4C_3$) slag 50 was used as the melt to generate the vapors. The temperature of the melt and at the sample 52 location were measured with a tungsten-rhenium (5% W—Re)–(26% W—Re) thermocouple which is capable of measuring temperatures up to 2200° C. A two color optical pyrometer was also used to measure the temperature. The two temperature measurement techniques agreed within 10° C. The furnace was continuously flushed with argon to avoid excessive oxidation. The off gas composition, provided through off gas sample tube 56, was measured by an inline mass spectrometer. The primary species were CO, Ar and $N_2$; all of the Al containing species either reacted or condensed before entering the mass spectrometer.

Several different types of carbon were used including wood charcoal, coke, petroleum ("pet") coke and graphite as the sample 52. Prior to reaction, the carbons used were examined in an SEM (scanning electron microscope). In addition, the bulk density, porosity and average pore size was measured. The carbon samples were in the form of cylinders, about 25 mm diameter by 25 mm high. The carbon sample was attached to a graphite rod 60 by drilling a hole through the carbon sample 52 through which the rod was placed and secured with a graphite nut 62.

The slag contained about 4 mass percent carbon. This slag was not saturated with $Al_4C_3$ at 2000° C. so that the $Al_2O_3$ reacted with carbon producing $Al_4C_3$, CO, Al(g) and $Al_2O$ (g). Once the desired temperature was achieved, and the vapors were being generated, the carbon samples were lowered into the chimney and reacted for a specified period of time and then withdrawn. The samples were rapidly transferred to a cooling chamber at room temperature which was continuously flushed with argon to avoid excessive oxidation of the reaction products or carbon. The samples were generally mounted and examined in an SEM and the phases analyzed. In a few cases the samples were analyzed chemically.

In a few experiments the carbon samples were initially held higher up in the chimney where the temperature was about 1930° C. As discussed in the next section, at this temperature, a ($Al_2O_3$—$Al_4C_3$) slag should form. In several experiments the sample was held at about 1930° C. for 10 to 20 minutes and then withdrawn to confirm that the slag formed on the carbon sample. In three subsequent experiments after holding the sample at about 1930° C. for 15 minutes, it was lowered to where the temperature was 1950° C. and the carbide should form. These experiments were conducted to determine if the slag formed would inhibit diffusion of the $Al_2O$ and Al into the carbon and therefore impede the formation of the carbide.

In the present experiments, a ($Al_4C_3$—$Al_2O_3$) slag is heated to about 2000–2020° C. which is not saturated with carbide. Therefore a reduction reaction takes place. To avoid oxidation and to estimate the rate of CO generation flowing Ar was also used in the experiments. The presence of Ar affects the reactions, $Al_2O$ and Al pressures and their subsequent reaction with carbon. The resulting gas as measured by the mass spectrometer was 50–55% CO and 45–50% Ar. At 2000° C. with the Ar and CO at this ratio the vapor pressure of $Al_2O$ and Al are 0.12 and 0.042 atmospheres respectively. If this CO—Ar—$Al_2O$—Al gas mixture is then reacted with carbon, $Al_4C_3$ will form in a $Al_2O_3$—$Al_4C_3$ slag at 1930° C. and pure carbide forms at 1950° C. The equilibrium pressures of $Al_2O$ and Al are 0.047 and 0.020 respectively with the carbide at 1950° C. There are uncertainties in the thermodynamics with respect to equilibrium pressures and the temperatures at which phases form. The information given above are the best estimates available at this time.

The bulk density, porosity and average pore size of several types of carbons used in the experiments are listed below in Table 2.

TABLE 2

| | Bulk Density g/cm³ (cu. cm) | Average Pore Diameter, μm | Open Porosity % | Total Porosity % |
|---|---|---|---|---|
| Met. Coke A* | 1.0378 | 0.0205 | 24.15 | 50.5 |
| Pet Coke* | 1.6003 | 0.0302 | 24.71 | 23.8 |
| Met. Coke B* | 0.919 | 0.0907 | 50.35 | 56.2 |
| Eucalyptus Wood Charcoal | 0.5165 | 0.0655 | 61.68 | 75.4 |

*Comparative examples

Two porosity measurements are given. Total porosity is computed from the bulk density. In typical SEM images for wood, the charcoal has a large uniform porosity. Whereas a number of types of carbon were used, the Eucalyptus wood charcoal reacted by far the best. As will be described, $Al_4C_3$ formed on and in the wood charcoal, with pet coke there was some reaction, while with graphite only the condensation reactions occurred at the outer surface of the carbon sample.

The phases present were primarily detected using an SEM and chemical analysis. As mentioned, with the denser carbons such as graphite, only condensation of $Al_2O_3$ and C formed presumably by the following reactions:

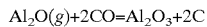

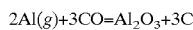

It should be noted that even with the Eucalyptus wood charcoal if the samples were not preheated effectively only condensation of $Al_2O_3$ and C on the surfaces occurred. With the Eucalyptus wood charcoal and a lesser degree with pet coke, $Al_4C_3$ or a $Al_4C_3$—$Al_2O_3$ slag formed depending on the sample temperature. In general, if the sample temperature exceeded 1950° C. little or no reaction occurred, between 1940° C. to 1960° C. $Al_4C_3$ formed, at 1910° C.–1930° C. a slag formed while below 1910° C. only condensation occurred. These results are in reasonable agreement with thermodynamic predictions.

SEM pictures of the carbide-carbon interface, of the carbide forming in the pores and of slag formation showed that the interface between the unreacted carbon and carbide phase was fairly distinct and easy to identify. There was a small region of partially reacted carbon. Carbide crystals begin to grow into the porosity of the carbon, and when there is primarily $Al_4C_3$ the porosity is greatly reduced. The liquid slag is dense and most likely slows any further reaction. Of importance is the rate and rate controlling mechanism for the formation of $Al_4C_3$. The SEM observation indicated that there was a shrinking unreacted core of carbon suggesting the rate is controlled by diffusion of Al(g) and $Al_2O(g)$ through the $Al_4C_3$ product layer.

Using graphite, metallurgical coke, petroleum coke and metallurgical coke (B), $Al_4C_3$ did not form to any great extent. Once the carbide begins to form it fills the pores on the surface and hinders further reaction if the porosity is low, less than about 50 vol. %. Metallurgical coke (B) did have a high porosity. However, it consisted of a very few large pores and numerous small pores. Again the reaction stops once these small pores are filled. So, in addition to high porosity the pores must be uniform in size as is the case for the Eucalyptus wood charcoal.

Several types of carbon which could be used in the process could not be made into single particles. Therefore, the carbon pieces were simply placed into a canister. The information obtained from these experiments was limited. The results did confirm that the charcoal reacted to give carbide and at lower temperatures slag or simple condensation of $Al_2O_3$ occurred. The pet and metallurgical coke did not react to form $Al_4C_3$ and mostly only $Al_2O_3$ condensate formed.

The experimental results indicated what type of carbon should be used in the vapor recovery reactor used in carbothermic reduction. Wood charcoal, preferably Eucalyptus wood charcoal with over 60 vol. % porosity' reacted extensively forming $Al_4C_3$ when exposed to CO—Al—$Al_2O_3$ gas generated from reduction of $Al_2O_3$. The high porosity is essential since the rate of reaction is controlled by the diffusion of the reaction gas through the pores of the product layer ($Al^4C_3$). Since there is a significant volume change going from carbon to the carbide the pores existing in the original carbon became filled with carbide crystals. This was confirmed by SEM analysis. To accommodate this increase in volume and maintain reasonable porosity in the carbide layer the porosity of the original carbon must be very high, greater than 50 vol. % or 60 vol. %.

In addition, the porosity should be relatively uniform. One of the metallurgical cokes tested had a high porosity but did not react extensively. The coke had a few large pores but the majority of the coke was not very porous. The area associated with the large pores was small as compared to the wood charcoal.

Another requirement for the carbon used in carbothermic reduction is the amount of ash. The ash normally consists of $SiO_2$, iron oxides, other oxides and iron sulfide. These oxides and sulfides will be reduced in the process, producing iron that is difficult to remove from the product. Again, the wood charcoal best fulfills this requirement; it contains the lowest amount of ash of any of the carbons tested except graphite which does not react and is not a practical carbon source. The ash content should be about 6 wt % or less, preferably about 2 wt % to 4 wt %, based on the weight of fixed carbon in the wood charcoal.

Having described the presently preferred embodiments, it is to be understood that the invention may be otherwise embodied within the scope of the appended claims.

What is claimed is:

1. A method for recovering Al containing vapor species from an off-gas produced in at least one smelter during carbothermic reduction of alumina to form aluminum, where the off-gas comprises CO, Al vapor and aluminum suboxide, comprising:
   (a) directing the said off-gas to an enclosed reactor;
   (b) supplying wood charcoal having a porosity of from about 50 vol. % to 85 vol. %, and a bulk density of from about 0.4 g/cm³ to 0.7 g/cm³; to the enclosed reactor; and
   (c) contacting the wood charcoal with the off-gas to produce a product comprising $Al_4C_3$.

2. The method of claim 1, wherein the wood-charcoal has an average pore diameter of from about 0.05 μm to about 2.00 μm.

3. The method of claim 1, wherein the wood-charcoal has a porosity in terms of mm³/g specific pore volume vs μm pore diameter selected from area A of FIG. 4.

4. The method of claim 1, wherein the wood-charcoal is Eucalyptus wood-charcoal.

5. The method of claim 1, wherein the wood-charcoal is Eucalyptus Camalduensis.

6. The method of claim 1, where, in step (c) there is a diffusion of a portion of the formed $Al_4C_3$ into the microstructure, impregnating a portion of the pores without forming a dense covering slag top layer.

7. The method of claim 1, wherein the wood charcoal has an ash content of from about 2% to 4%, based on weight of fixed carbon in the wood charcoal.

8. The method of claim 1, wherein the wood charcoal has a large number of interconnected pores.

9. The method of claim 1, wherein the enclosed reactor is a counter-current moving bed reactor.

10. The method of claim 1, wherein the enclosed reactor is at least one fluid bed reactor.

11. The method of claim 1, wherein the wood charcoal in step (c) produces at least an 85% conversion of the carbon in the wood charcoal to carbide as $Al_4C_3$.

12. The method of claim 1, where the $Al_4C_3$ formed in step (c) is passed back to the at least one smelter for further carbothermic reduction.

* * * * *